(12) United States Patent
Liu (10) Patent No.: US 7,321,473 B2
(45) Date of Patent: Jan. 22, 2008

(54) APERTURE AND PROJECTION LENS SYSTEM

(75) Inventor: Chin-Ku Liu, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 86 days.

(21) Appl. No.: 11/164,023

(22) Filed: Nov. 8, 2005

(65) Prior Publication Data

US 2006/0221475 A1  Oct. 5, 2006

(30) Foreign Application Priority Data

Apr. 4, 2005  (TW) .............................. 94110687 A (51) Int. Cl.
*G02B 9/08* (2006.01)

(52) U.S. Cl. ...................... 359/738; 359/649; 359/722; 359/741

(58) Field of Classification Search ......... 359/738–740
See application file for complete search history.

(56) References Cited

U.S. PATENT DOCUMENTS

| 7,008,065 | B2 * | 3/2006 | English et al. ................ 353/97 |
| 7,042,658 | B2 * | 5/2006 | Chen et al. .................. 359/723 |
| 2005/0275956 | A1 * | 12/2005 | Larson et al. ............... 359/738 |
| 2007/0035852 | A1 * | 2/2007 | Farr ........................... 359/738 |

\* cited by examiner

*Primary Examiner*—Jordan M. Schwartz
(74) *Attorney, Agent, or Firm*—Jianq Chyun IP Office (57) ABSTRACT

An aperture comprising a round filter portion and at least one annular filter portion is provided. The round filter portion and the annular filter portion are forming a round zone. A transmission wavelength range of the round filter portion is larger than a transmission wavelength range of the annular filter portion. A projection lens system with the aperture can produce images having higher brightness of the images and better image quality.

8 Claims, 7 Drawing Sheets

spot diagram of blue light

FIG. 2A (PRIOR ART)

spot diagram of green light

FIG. 2B (PRIOR ART)

spot diagram of red light

FIG. 2C (PRIOR ART)

spot diagram of blue light

FIG. 3A (PRIOR ART)

spot diagram of green light

FIG. 3B (PRIOR ART)

spot diagram of red light

FIG. 4B spot diagram of blue light

FIG. 5A spot diagram of green light

FIG. 5B spot diagram of red light

APERTURE AND PROJECTION LENS SYSTEM

CROSS-REFERENCE TO RELATED APPLICATION

This application claims the priority benefit of Taiwan application serial no. 94110687, filed on Apr. 4, 2005. All disclosure of the Taiwan application is incorporated herein by reference.

BACKGROUND OF THE INVENTION

1. Field of the Invention

The present invention relates to an aperture and a projection lens system, and particularly to an aperture having a plurality of filter portions and a projection lens system having the aperture.

2. Description of Related Art

Figure 1A:
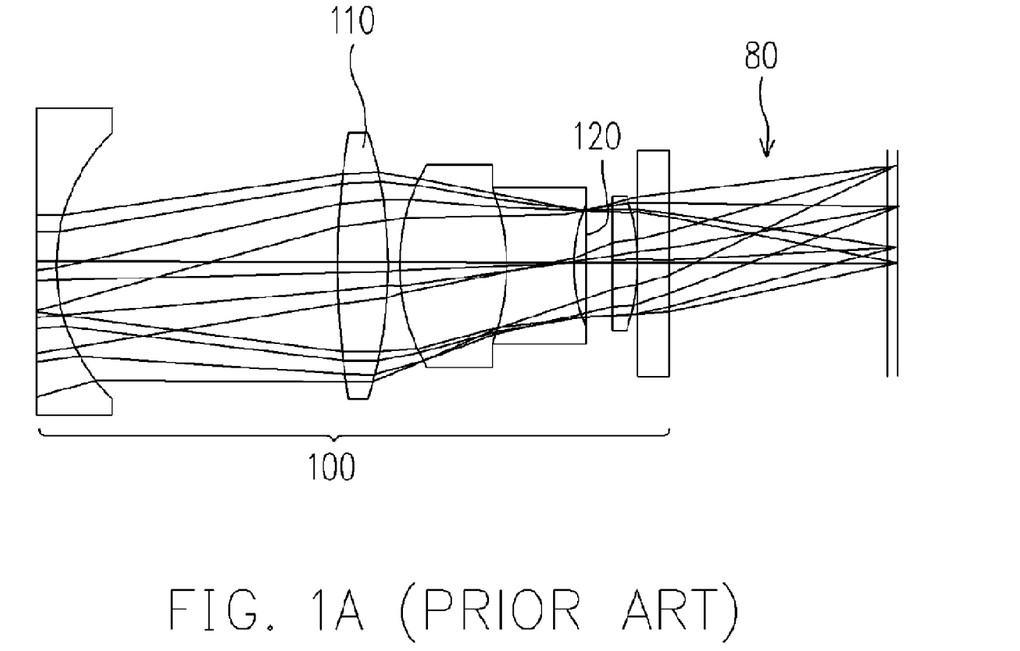
FIG. 1A is a schematic structure diagram for illustrating a conventional projection lens system.
Figure 1B:
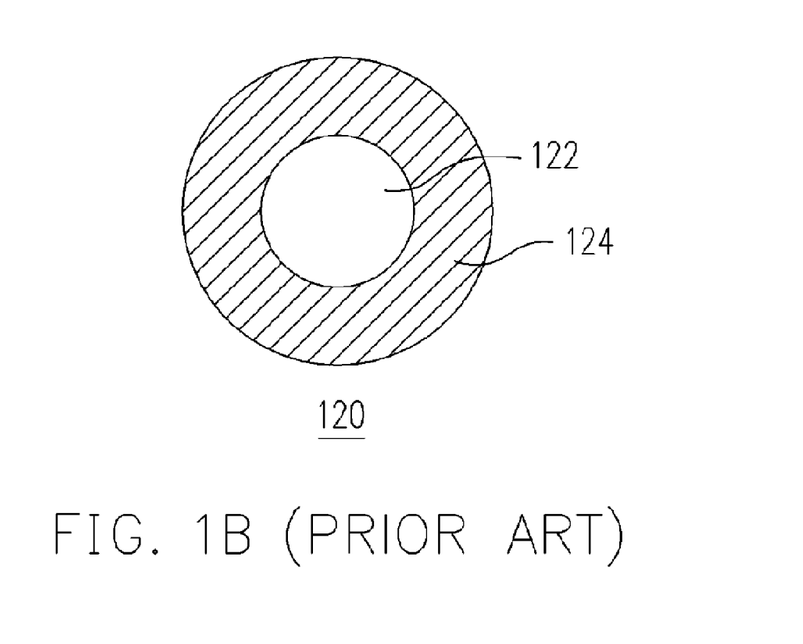
FIG. 1B is a structure diagram for illustrating an aperture of FIG. 1A.

FIG. 1A is a diagram for illustrating a structure of a conventional projection lens system 100, and FIG. 1B is a diagram for illustrating a structure of an aperture 120 shown in FIG. 1A. Referring to FIGS. 1A and 1B, the conventional projection lens system 100 comprises a plurality of lenses 110 and the aperture 120, the aperture 120 being disposed among the lenses 110. The projection lens system 100 is adapted to project beams 80 onto a screen (not shown) for forming images. The aperture 120 has a transmission portion 122 and an absorption portion 124, in which the transmission portion 122 is adapted for allowing the beams 80 to pass through and the absorption portion 124 is adapted for absorbing the beams 80. In addition, a diameter of the transmission portion 122 is relative to a value of f-number, which is the focal length divided by the diameter of the transmission portion 122, and usually is represented by f/number. The larger the number is, the smaller the diameter of the transmission portion 122 is. And the smaller the number is, the larger the diameter of the transmission portion 122 is.

Figure 2A:
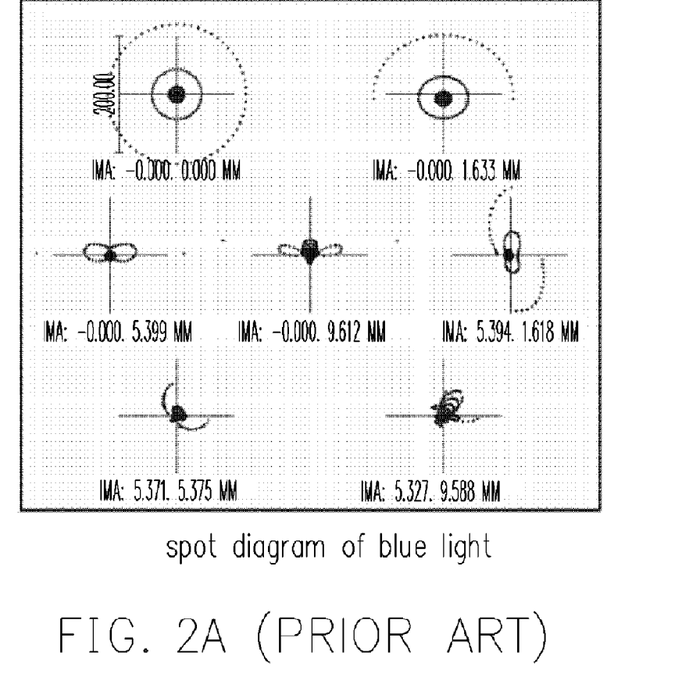
FIGS. 2A to 2C are spot diagrams of a blue light, green light and red light when an aperture having an f-number of f/2.1 is used in a projection lens system.
Figure 2B:
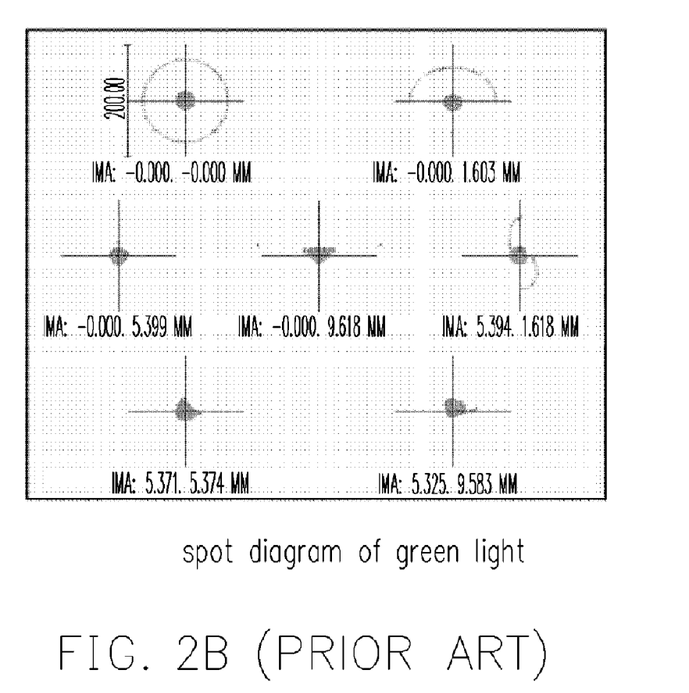
Figure 2C:
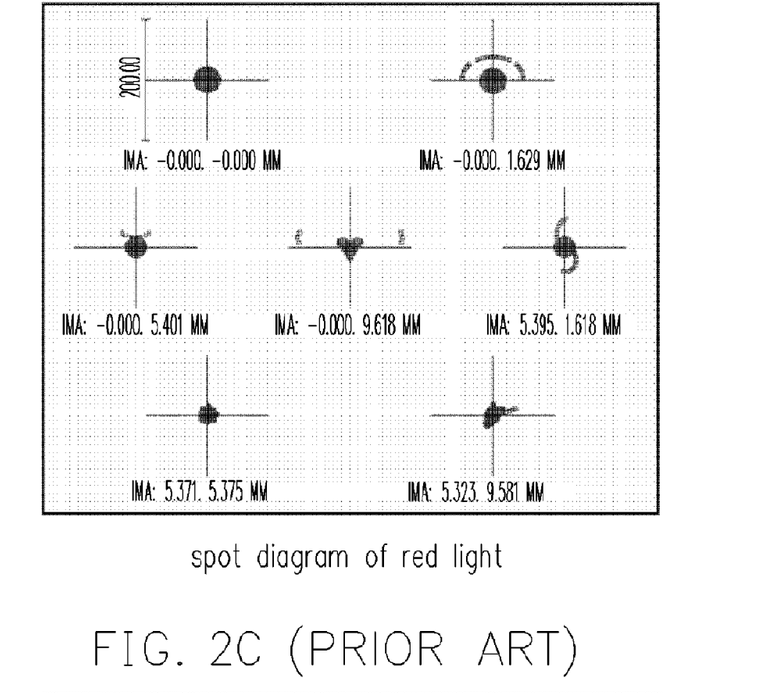

FIGS. 2A to 2C are spot diagrams of a blue light, green light and red light when an aperture with an f-number of f/2.1 is used in a projection lens system. Generally, after passing the apertures having the same f-number, a beam having shorter wavelength forms a spot diagram having a larger diameter. Therefore, referring to FIGS. 2A to 2C, the diameter of the spot of the blue light is the largest and the diameter of the spot of the red light is the smallest. However, the diameters of the spots affect the image quality, and the diameter of the spot of the blue light shown in FIG. 2A is too large to produce desired image quality.

Figure 3A:
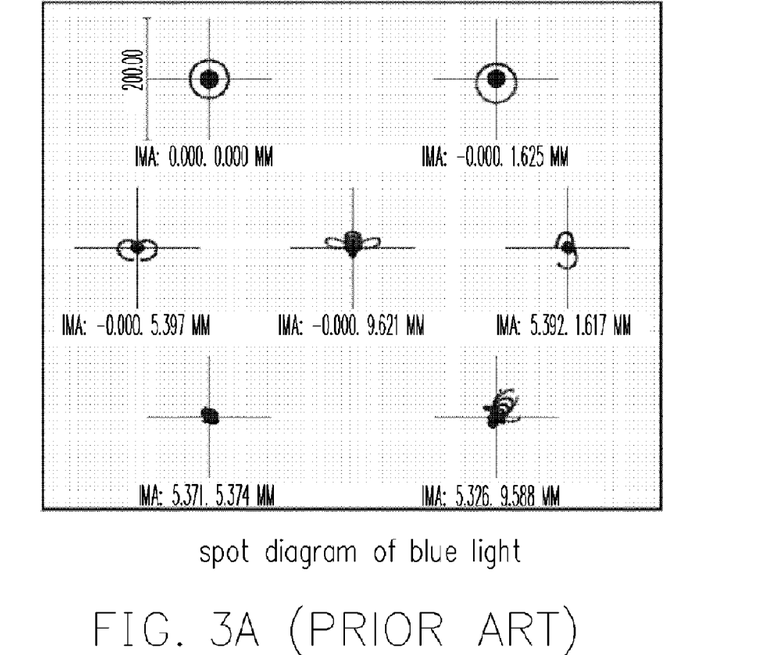
FIGS. 3A to 3C are spot diagrams of a blue light, green light and red light when an aperture having an f-number of f/2.4 is used in a projection lens system.
Figure 3B:
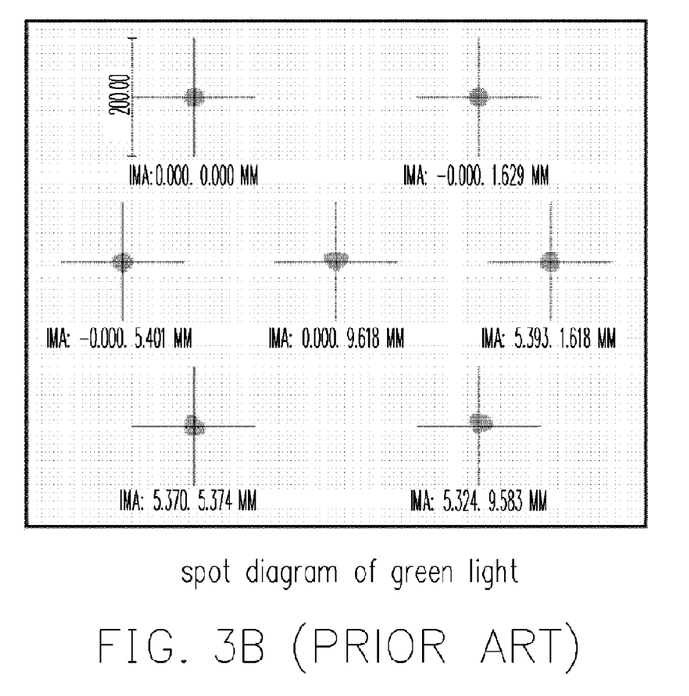
Figure 3C:
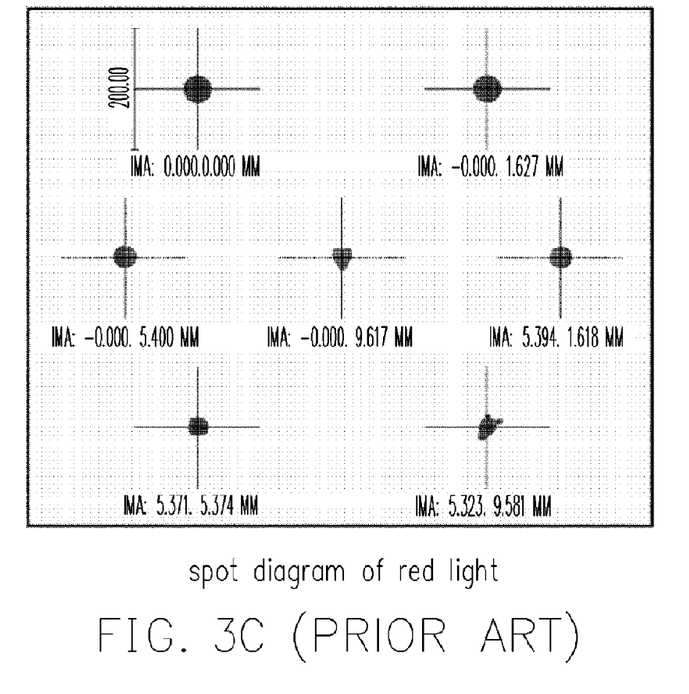

FIGS. 3A to 3C are spot diagrams of a blue light, green light and red light when an aperture with an f-number of f/2.4 is used in a projection lens system. Referring to FIGS. 3A to 3C, generally, for improving the image quality, an aperture having a larger number (or having a relatively small diameter in the transmission portion 122) is used to decrease the spot. Compared with those shown in FIGS. 2A to 2C, all the spots of blue light, green light and red light in FIGS. 3A to 3C are smaller. Therefore, an aperture having a larger number of the f-number can improve the image quality.

However, by using the aperture having the larger number of the f-number, the diameter of the transmission portion 122 (shown as FIG. 1) is smaller, and the light influx is less, thus a brightness of the image is also reduced.

In view of the above, when adopting the aperture having the smaller number, the conventional lens system produces images having higher brightness but worse image quality, when adopting the aperture having the larger number, the conventional lens system produces images having lower brightness but better image quality. Therefore, the conventional projection lens system cannot produce images having better image quality and higher brightness of the images at the same time.

SUMMARY OF THE INVENTION

In view of the above, an object of the present invention is to provide an aperture for producing images having higher brightness and better image quality.

Another object of the present invention is to provide a projection lens system for producing images having higher brightness and better image quality.

According to the above and other objects, an aperture comprising a round filter portion and at least one annular filter portion is provided in the present invention, the round filter portion and the annular filter portion are forming a round zone. A transmission wavelength range of the round filter portion is larger than a transmission wavelength range of the annular filter portion.

The present invention also provides a projection lens system comprising a lens and an aperture, the aperture being disposed in front of the lens. The aperture comprises a round filter portion and at least one annular filter portion, the round filter portion and the annular filter portion forming a round zone. A transmission wavelength range of the round filter portion is larger than a transmission wavelength range of the annular filter portion.

The maximum transmission wavelength of the round filter portion is the same as the maximum transmission wavelength of the annular filter portion.

The annular filter portion can be plural, in which an inner annular filter portion has a larger transmission wavelength range than the others. The annular filter portions include a first annular filter portion and a second annular filter portion, the first annular filter portion being located between the round filter portion and the second annular filter portion. The first annular filter portion can further include a first film filter, and the second annular filter portion can further include a second film filter. Also, the round filter portion can further include a third film filter.

The transmission wavelength range of the round filter portion is equal to the combined wavelength range of the red light, green light and blue light. The transmission wavelength range of the first annular filter portion is equal to the combined wavelength range of the red light and green light. The transmission wavelength range of the second annular filter portion is equal to the wavelength range of the red light.

In view of the above, because the present invented aperture has different f-numbers in accordance with different wavelength ranges, large spots of red light, green light and blue light can be prevented from affecting the image quality, and the light influx of red light and green light can be increased accordingly, thus increasing the brightness of the images projected by the projection lens system. In summary, the images having better image quality and higher brightness can be produced by the present invented aperture and the projection lens system.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 4A:
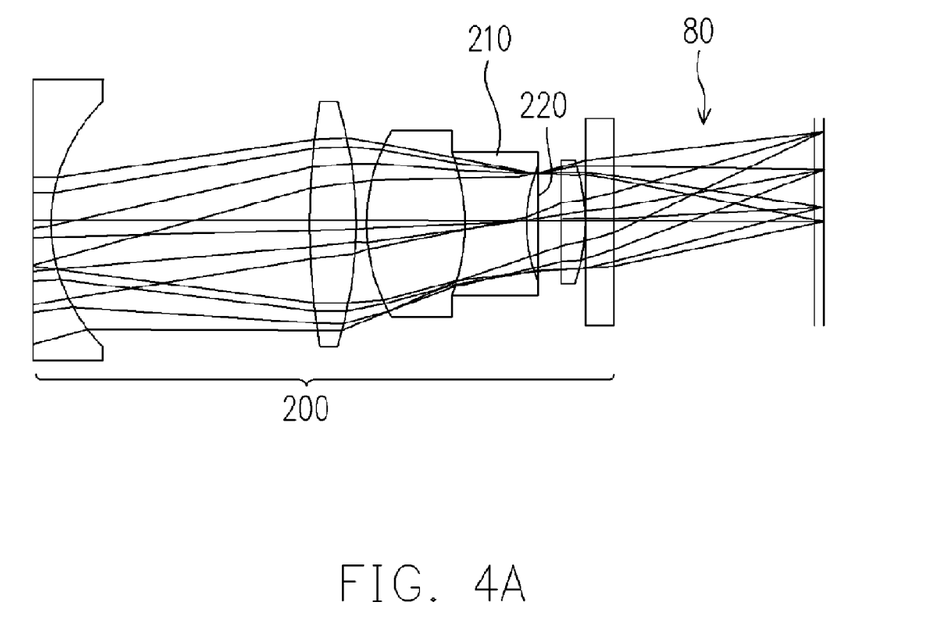
FIG. 4A is a schematic structure diagram for illustrating a projection lens system according to an embodiment of the present invention.
Figure 4B:
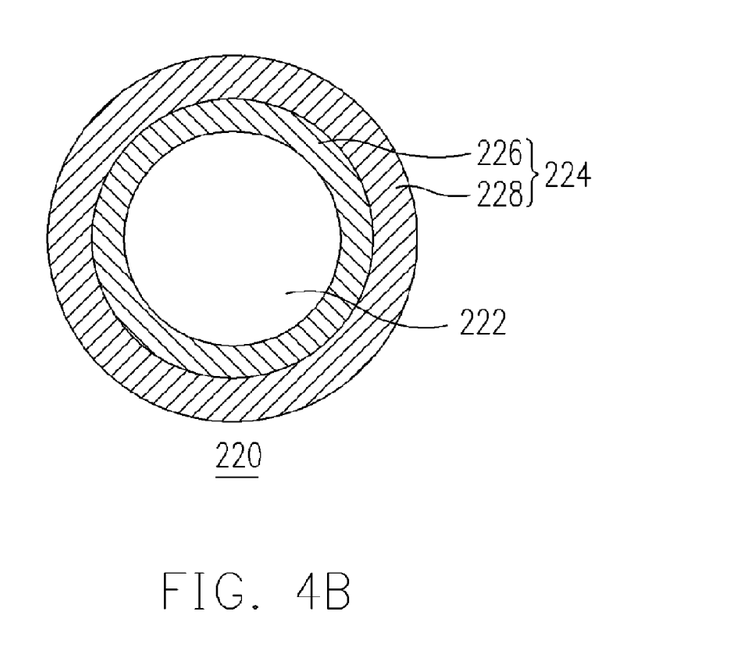
FIG. 4B is a structure diagram for illustrating an aperture of FIG. 4A.

FIG. 4A is a schematic structure diagram for illustrating a projection lens system according to an embodiment of the present invention and FIG. 4B is a structure diagram for illustrating an aperture of FIG. 4A. Referring to FIGS. 4A and 4B, a projection lens system 200 according to the embodiment of the present invention comprises at least one lens 210 and an aperture 220. The aperture 220 is disposed in front of the lens 210. The aperture 220 comprises a round filter portion 222 and at least one annular filter portion 224. The round filter portion 222 and the annular filter portion 224 are forming a round zone. A transmission wavelength range of the round filter portion 222 is larger than a transmission wavelength range of the annular filter portion 224.

The optical lens system 200 is illustrated as a projection lens system for example, being adapted to project beams 80 onto a screen (not shown) for forming images. However, the projection lens system of the embodiment is not limited to the projection lens system, and can also be other lens systems, such as lens systems for cameras or video cameras etc. The annular filter portion 224 can be plural, in which an inner annular filter portion has a larger transmission wavelength range than the others. In the embodiment according to the present invention, the annular filter portions 224 comprise a first annular filter portion 226 and a second annular filter portion 228. The first annular filter portion 226 is located between the round filter portion 222 and the second annular filter portion 228. Furthermore, a transmission wavelength range of the first annular filter portion 226 is larger than a transmission wavelength range of the second annular filter portion 228.

Further, the first annular filter portion 226 can further include a first film filter, and the second annular filter portion 228 can further include a second film filter. The first annular filter portion 226 and the second annular filter portion 228 have different transmission wavelength ranges in accordance with the different film filters. The first film filter and the second film filter can be formed by coating technology. Because the coating technology is rather mature and inexpensive, the yield of the aperture 220 can be increased and the production cost can be lowered. Moreover, the round filter portion 222 has a third film filter or not.

In the embodiment of the present invention, the maximum transmission wavelength ranges of the round filter portion 222 and the annular filter portion 224 are the same. For example, the transmission wavelength range of the round filter portion 222 is equal to the combined wavelength range of the red light, green light and blue light. The transmission wavelength range of the first annular filter portion 226 is equal to the combined wavelength range of the red light and green light. The transmission wavelength range of the second annular filter portion 228 is equal to the wavelength range of the red light. Herein, a central value of the transmission wavelength range of the red light is 625 nm, a central value of the transmission wavelength range of green light is 527 nm, and a central value of the transmission wavelength range of blue light is 465 nm. In other words, the red light can pass through the round filter portion 222, the first annular filter portion 226 and the second annular filter portion 228, the green light can pass through the round filter portion 222 and the first annular filter portion 226, and the blue light can only pass through the round filter portion 222. In detail, the diameter of the round filter portion 222, the outer diameter of the first filter portion 226 and the outer diameter of the second filter portion 228 are respectively equal to the diameters corresponding to the f-numbers of f/2.4, f/2.26 and f/2.1, then the f-number of the aperture 220 for blue light is f/2.4, the f-number of the aperture 220 for green light is f/2.26, and the f-number of the aperture 220 for red light is f/2.1. Accordingly, the f-number of blue light with shorter wavelength can be larger than the f-numbers of red light and green light, so that the diameter of the spots can be sized down and the image quality can be improved.

In the conventional technology, the apertures having larger f-numbers are used for improving the image quality while reducing the light influx of blue light, green light and red light and decreasing the brightness of the images. The aperture 220 of the embodiment has different f-numbers relative to blue light, green light and red light such that oversized diameters of spots of blue light, green light and red light can be avoided from affecting the image quality, and the light influx of green light and red light are increased for increasing the brightness of the images projected by the projection lens system 200.

Figure 5A:
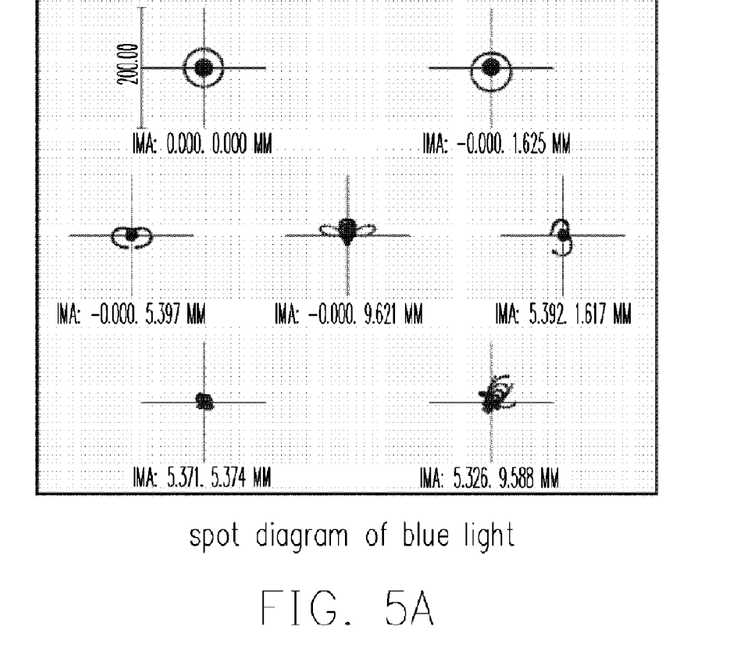
FIGS. 5A to 5C are spot diagrams of a blue light, green light and red light after passing through a projection lens system according to the embodiment of the present invention.
Figure 5B:
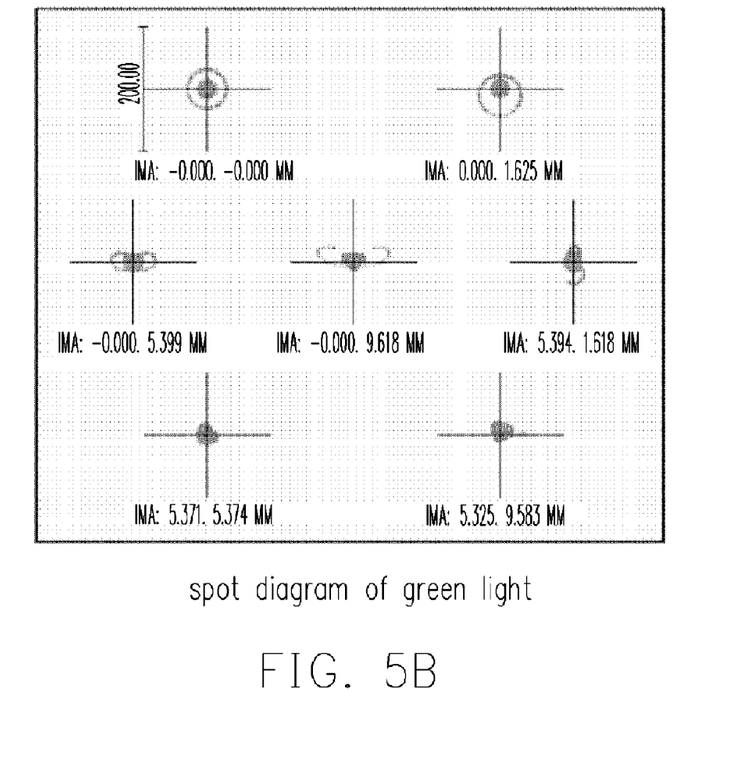
Figure 5C:
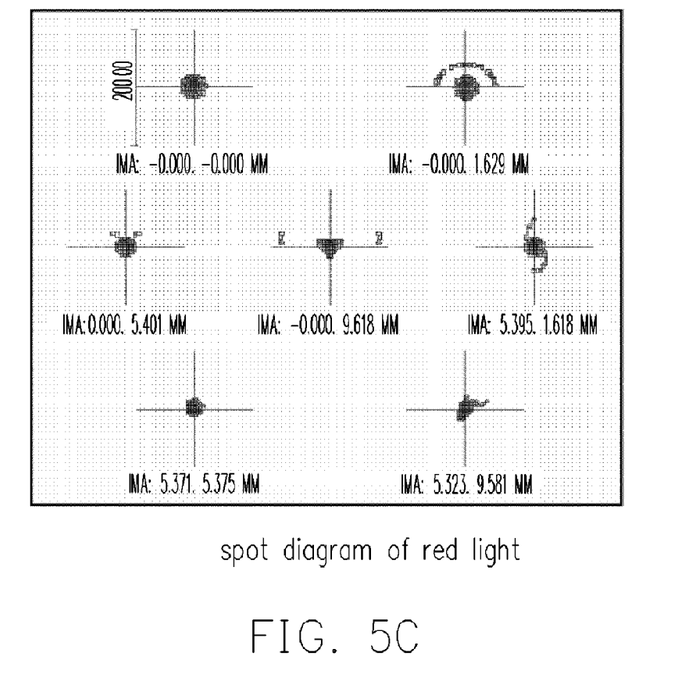

FIGS. 5A to 5C are spot diagrams of a blue light, green light and red light after passing through the projection lens system according to the embodiment of the present invention. Referring to FIGS. 5A to 5C, the f-numbers of the aperture 220 for the blue light, green light and red light respectively are f/2.4, f/2.26 and f/2.1, for example, so the spots of blue light, green light and red light are proper in size, therefore the images projected by the projection lens system 200 of the embodiment have better image quality.

Figure 6:
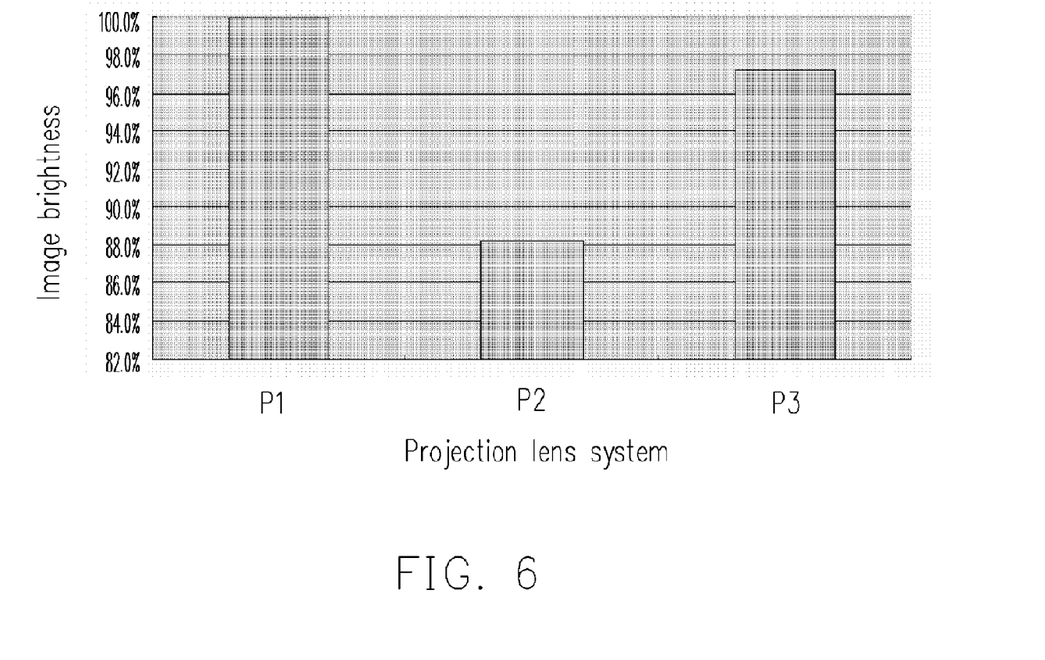
FIG. 6 is a diagram for comparing the brightness of images projected by different projection lens systems.

FIG. 6 is a diagram for comparing the brightness of images projected by different projection lens systems. Referring to FIG. 6, the f-numbers of the projection lens systems P1 and P2 respectively are f/2.1 and f/2.4 and the f-numbers of the projection lens system P3 of the embodiment respectively are f/2.4, f/2.26 and f/2.1. The brightness of the images projected by the projection lens system P3 of the embodiment is apparently higher than the brightness of the images projected by the projection lens system P2 and slightly lower than the brightness of the images projected by the projection lens system P1. Therefore, images having higher brightness of the images and better image quality can be produced by projection lens systems of the embodiment.

It is noted that, the above-mentioned f-numbers, spot diagrams and the diagrams for comparing the brightness are only exemplary, and are not used to limit the scope of the present invention. In this embodiment, the transmission wavelength ranges of the round filter portion 222, the first annular filter portion 226 and the second filter portion 228 in the aperture 220 can be adjusted upon requirement. The quantity of the annular filter portion 224 can also vary upon requirement. The aperture 220 of the embodiment can be applied in a projection lens system 200, and widely used in image producing systems such as an illumination system of projectors.

In summary, the aperture and the projection lens system of the present invention have at least the following advantages:

1. Because the aperture of the embodiment has different f-numbers for lights with different wavelengths, oversized spots of blue light, green light and red light can be avoided from affecting the image quality, and the light influx of green light and red light can be increased for increasing the brightness of the images projected by the projection lens system, therefore images having higher brightness and better quality can be produced by projection lens systems of the embodiment.

2. Because the coating technology is mature and inexpensive, the film filter formed in such technology can improve the yield of the aperture and decrease the production cost.

It should be noted that specific embodiments of, and examples for, the invention are described herein for illustrative purposes, various equivalent modifications are possible within the scope of the invention, as those skilled in the relevant art recognize that modifications and adaptations of the above-described preferred embodiments of the present invention can be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An aperture, comprising:
    a round filter portion, a transmission wavelength range of the round filter portion being equal to a combined wavelength range of a red light, a green light and a blue light; and
    a plurality of annular filter portions, comprising a first annular filter portion and a second annular filter portion, the first annular filter portion being located between the round filter portion and the second annular filter portion, a transmission wavelength range of the first annular filter portion being equal to a combined wavelength range of the red light and the green light, a transmission wavelength range of the second annular filter portion being equal to the wavelength range of the red light, the transmission wavelength range of the first annular filter portion being larger than the transmission wavelength range of the second annular filter portion, wherein the round filter portion and the annular filter portions form a round zone and the transmission wavelength range of the round filter portion is larger than the transmission wavelength range of the first annular filter portion and the second annular filter portion.

2. The aperture according to claim 1, wherein a maximum transmission wavelength of the round filter portion is the same as a maximum transmission wavelength of the first annular filter portion and a maximum transmission wavelength of the second annular filter portion.

3. The aperture according to claim 1, wherein the first annular filter portion further comprises a first film filter, and the second annular filter portion further comprises a second film filter.

4. The aperture according to claim 3, wherein the round filter portion comprises a third film filter.

5. A projection lens system, comprising:
    a lens; and
    an aperture, disposed in front of the lens, the aperture comprising a round filter portion and a plurality of annular filter portions, a transmission wavelength range of the round filter portion being equal to a combined wavelength range of a red light, a green light and a blue light, the plurality of annular filter portions comprising a first annular filter portion and a second annular filter portion, the first annular filter portion being located between the round filter portion and the second annular filter portion, a transmission wavelength range of the first annular filter portion being equal to a combined wavelength range of the red light and the green light, a transmission wavelength range of the second annular filter portion being equal to the wavelength range of the red light, the transmission wavelength range of the first annular filter portion being larger than the transmission wavelength range of the second annular filter portion, wherein the round filter portion and the annular filter portion forms a round zone and the transmission wavelength range of the round filter portion is larger than the transmission wavelength range of the first annular filter portion and the second annular filter portion.

6. The projection lens system according to claim 5, wherein a maximum transmission wavelength of the round filter portion is the same as a maximum transmission wavelength of the first annular filter portion and a maximum transmission wavelength of the second annular filter portion.

7. The projection lens system according to claim 5, wherein the first annular filter portion further comprises a first film filter, and the second annular filter portion further comprises a second film filter.

8. The projection lens system according to claim 7, wherein the round filter portion comprises a third film filter.

* * * * *